Patented Oct. 16, 1945

2,386,764

UNITED STATES PATENT OFFICE 2,386,764

SYNTHETIC RUBBER LATEX

Benjamin M. G. Zwicker, Akron, Ohio, assignor, by mesne assignments, to The B. F. Goodrich Company, Akron, Ohio, a corporation of New York No Drawing. Application September 9, 1941, Serial No. 410,171

10 Claims. (Cl. 260—23)

This invention relates to synthetic rubber latices and particularly to a method whereby synthetic rubber latices of increased stability may be produced.

It is well known that by the polymerization in the form of an aqueous emulsion of butadienes either alone or in the presence of monomers copolymerizable therewith, synthetic rubber latices may be prepared. The latices can be readily obtained in a stable form by effecting the polymerization in the presence of a relatively large amount, 5-10% by weight based on the monomers for instance, of an emulsifying agent which is a colloidal electrolyte such as soap. The soap has no harmful effect if the latex is to be coagulated and employed as a massive product, for it can be washed from the coagulum. When the synthetic rubber latex is to be employed in the same manner as natural latex for the deposition of thin films of rubber, however, the presence of the soap or other electrolyte emulsifying agent is a decided disadvantage because of the deleterious effect of the emulsifying agent upon the properties of the films. Reduction of the amount of electrolyte emulsifying agent to lessen the harmful effect upon the properties of the films deposited from the latex may reduce the stability of the latex to a point where it is easily coagulated by the addition of compounding ingredients or even by mechanical agitation.

I have now discovered that stable synthetic rubber latices which may be deposited in the form of films of superior properties may be obtained by providing as the emulsifying agent a mixture of an emulsifying agent which is a colloidal electrolyte and an emulsifying agent which is nonionizable but which forms a true aqueous solution.

A number of emulsifying agents which are colloidal electrolytes are known to be useful in the emulsion polymerization of butadienes. Water-soluble soaps such as sodium oleate, potassium palmitate, sodium myristate, sodium laurate, and other alkali metal salts of higher fatty acids are preferred materials, although other known materials may be employed including hymolal sulfates and aryl sulfonates such as sodium lauryl sulfate and sodium isopropyl naphthalene sulfonate, and salts of organic bases containing long carbon chains such as the hydrochloride of diethylaminoethyloleylamide, trimethylcetylammonium methyl sulfate, etc.

A number of non-ionizable emulsifying agents which form true aqueous solutions are known. One class of such emulsifying agents is the polyether-alcohols. Emulsifying agents of this class are generally compounds containing a carbohydrophylic group (that is, a group which has an affinity for hydrocarbons) which is a long aliphatic chain or an alkylated aromatic group at one end of the molecule and a hydrophylic group (that is, a group which has an affinity for water) which is a chain of $(O-CH_2-CH_2-)_n$ groups preferably terminating with a hydroxyl group at the other end of the molecule. These compounds are in general prepared by condensation reactions of higher alcohols containing from 10 to 18 carbon atoms or compounds containing an alkaryl group such as an isopropylphenyl or diisopropyl naphthyl group with ethylene oxide. Similar condensation reactions may also be effected employing glycide. The preparation of this type of emulsifying agent is described in U. S. Patent No. 2,222,967 and British Patent No. 380,431. A number of water-soluble non-ionizable emulsifying agents believed to be of above type are commercially available under names such as "Triton NE," "Igepal C," and "Emulphor O." Other non-ionizable emulsifying agents which form true aqueous solutions contain a number of hydroxyl groups. Thus polyvinyl alcohol of low molecular weight forms true aqueous solutions and may suitably be employed in the practice of the invention.

Protective colloids and colloidal emulsifying agents such as albumen, gelatin, and glue are not within the scope of this invention since they form colloidal rather than true aqueous solutions, and they are not equivalent in their behavior to the non-ionizable emulsifying agents herein described.

The proportions in which the two types emulsifying agents are included in the latex are by no means critical, and are subject to wide variations depending upon the type of latex employed and the degree of stability desired. There should be sufficient colloidal electrolyte emulsifying agent present during the polymerization to obtain a heterogeneous rather than a homogeneous polymer as the product. The amount of emulsifying agent theoretically necessary to form a perfect emulsion can be calculated by known methods, and the use of an excess is preferred. When a mixture of from 80 to 50 parts of butadiene and from 20 to 50 parts of a monomer such as acrylonitrile or methyl methacrylate is polymerized to form a latex containing between 20 and 40% total solids, for instance, it is ordinarily desirable to employ at least 1% of colloidal electrolyte emulsifying agent based on the monomers, although a considerably smaller amount can be satisfactorily employed. The amount of electrolyte emulsifying agent can be increased as desired, although the quality of the films formed from the latex is seriously impaired when 5% or more is employed. Sufficient electrolyte emulsifying agent to effect heterogeneous polymerization should be present, as mentioned above, throughout the polymerization. The non-ionizable agent may be added either before, during, or after the polymerization in sufficient quantity to produce a latex of the desired stability.

Many methods of polymerizing butadienes are described in the prior art. As a typical example, 100 parts by weight of butadiene, or preferably a mixture of butadiene with a smaller amount of a monomer copolymerizable therewith such as styrene or acrylonitrile, may be emulsified in 150 parts of a 1% aqueous solution of a colloidal electrolyte emulsifying agent such as sodium oleate or sodium isopropyl naphthalene sulfonate. Various catalysts, initiators, and modifiers may be included in the emulsion prior to or during the emulsion as described in the prior art. The product is ordinarily obtained in the form of a synthetic rubber latex in from 24 to 48 hours depending upon the specific materials employed. The latex obtained under these conditions produces satisfactory films, but is coagulated by vigorous agitation, and is also readily coagulated by the addition of materials ordinarily used to compound synthetic rubber latices such as litharge and zinc oxide. The addition of a non-ionizable emulsifying agent which forms a true aqueous solution, such as 2% based on the polymer of "Triton NE," "Igepal C," or any other of the materials described above, produces a much more stable latex, and does not adversely affect the properties of films deposited from the latex as would the addition of a like amount of soap.

If desired, the non-ionizable emulsifying agent may be present in the emulsion during the polymerization. In one example, 55 parts by weight of butadiene and 45 parts of acrylonitrile were agitated in the presence of 0.35 part of hydrogen peroxide as an initiator, 0.12 part of sodium ferri pyrophosphate as an activator, 0.6 part of diisopropyl dixanthogen as a modifier and about 250 parts of an aqueous solution containing 0.8 part of myristic acid which had been 85% neutralized with sodium hydroxide and 1.2 parts of "Triton NE" which is believed to be a polyetheralcohol prepared by an ethylene oxide condensation reaction as described above. The polymerization was finished in 36 hours. There was obtained a practically quantitative yield of synthetic rubber latex which was much more stable than latices prepared by substitution of the "Triton NE" by colloidal electrolyte emulsifying agents. Furthermore, the presence of the non-ionizable emulsifying agent during the polymerization exerted a catalytic effect. When the "Triton NE" was omitted, the polymerization required 69 hours; when the soap was omitted, no polymerization occurred in 197 hours. Similar results are obtained with other non-ionizable emulsifying agents which form true aqueous solutions such as "Igepal C" and "Cyclopon A."

The method of this invention may be applied to synthetic rubber latices prepared by the polymerization in the form of an aqueous emulsion of other butadienes such as isoprene, piperylene, 2,3 - dimethylbutadiene, chloroprene, or other homologues or analogues of butadiene-1,3 which enter into polymerization reactions in essentially the same manner, either alone or in admixture with each other and/or other monomers copolymerizable therewith such as styrene, isobutylene, acrylonitrile, methyl methacrylate, methyl acrylate, methyl vinyl ether, methyl vinyl ketone, and other unsaturated hydrocarbons, esters, ethers, and ketones all of which contain a terminal methylene group ($CH_2$) attached by an olefinic double bond to a carbon atom.

Although I have herein disclosed specific embodiments of my invention, I do not intend to limit the invention solely thereto for it will be obvious to those skilled in the art that many variations and modifications are within the spirit and scope of the invention as defined in the appended claims.

I claim:

1. A synthetic rubber latex prepared by the polymerization of a butadiene-1,3 hydrocarbon in an aqueous emulsion containing, as an emulsifying agent, a colloidal electrolyte selected from the class consisting of water-soluble soaps of saturated higher fatty acids, alkali metal alkaryl sulfonates, alkali metal higher alkyl sulfates and water-soluble salts of higher aliphatic bases, said latex containing, in addition to the said colloidal electrolyte, another emulsifying agent which is a truly water-soluble and non-ionizable long-chained organic compound selected from the class consisting of polyvinyl alcohol and polyether alcohols prepared by the condensation of a compound containing an ethylene oxide linkage with a water-insoluble organic hydroxy compound containing a higher aliphatic radical, the said synthetic rubber latex being stable against coagulation by mechanical agitation and by the addition thereto of latex compounding ingredients and being capable of being deposited to form strong, elastic synthetic rubber films.

2. A synthetic rubber latex prepared by the polymerization of a mixture of butadiene-1,3 and a monomer which contains a terminal methylene ($CH_2$) group connected by an olefinic double bond to a carbon atom and is copolymerizable therewith in aqueous emulsion, in an aqueous emulsion containing, as an emulsifying agent, a colloidal electrolyte selected from the class consisting of water-soluble soaps of saturated higher fatty acids, alkali metal alkaryl sulfonates, alkali metal higher alkyl sulfates and water-soluble salts of higher aliphatic bases, said latex containing, in addition to the said colloidal electrolyte, another emulsifying agent which is a truly water-soluble and non-ionizable long-chained organic compound selected from the class consisting of polyvinyl alcohol and polyether alcohols prepared by the condensation of a compound containing an ethylene oxide linkage with a water-insoluble organic hydroxy compound containing a higher aliphatic radical, the said synthetic rubber latex being stable against coagulation by mechanical agitation and by the addition thereto of latex compounding ingredients and being capable of being deposited to form strong, elastic synthetic rubber films.

3. A synthetic rubber latex prepared by the polymerization of a mixture of butadiene-1,3 and acrylonitrile in an aqueous emulsion containing, as an emulsifying agent, a colloidal electrolyte selected from the class consisting of water-soluble soaps of saturated higher fatty acids, alkali metal alkaryl sulfonates, alkali metal higher alkyl sulfates and water-soluble salts of higher aliphatic bases, said latex containing in addition to the said colloidal electrolyte, another emulsifying agent which is a truly water-soluble and non-ionizable long-chained organic compound selected from the class consisting of polyvinyl alcohol and polyether alcohols prepared by the condensation of a compound containing an ethylene oxide linkage with a water insoluble organic hydroxy compound containing a higher aliphatic radical, the said synthetic rubber latex being stable against coagulation by mechanical agitation and by the addition thereto of latex compounding ingredients and being capable of being deposited to form strong elastic synthetic rubber films.

4. A synthetic rubber latex prepared by the polymerization of a mixture of butadiene-1,3 and a monomer which contains a terminal methylene ($CH_2$) group connected by an olefinic double bond to a carbon atom and is copolymerizable therewith in aqueous emulsion, in an aqueous emulsion containing, as an emulsifying agent, a colloidal electrolyte selected from the class consisting of water-soluble soaps of saturated higher fatty acids, alkali metal alkaryl sulfonates, alkali metal higher alkyl sulfates and water-soluble salts of higher aliphatic bases, said latex containing in addition to the said colloidal electrolyte, another emulsifying agent which is a polyether-alcohol prepared by the condensation of a compound containing an ethylene oxide linkage with an alcohol containing from 10 to 18 carbon atoms, the said synthetic rubber latex being stable against coagulation by mechanical agitation and by the addition thereto of latex compounding ingredients and being capable of being deposited to form strong, elastic synthetic rubber films.

5. A synthetic rubber latex prepared by the polymerization of a mixture of butadiene-1,3 and acrylonitrile in an aqueous emulsion containing, as an emulsifying agent, an alkali metal alkaryl sulfonate, said latex also containing, in addition to the said sulfonate, another emulsifying agent which is a polyether-alcohol prepared by the condensation of ethylene oxide with a fatty alcohol containing from 10 to 18 carbon atoms, the said synthetic rubber latex being stable against coagulation by mechanical agitation and by the addition thereto of latex compounding ingredients and being capable of being deposited to form strong, elastic synthetic rubber films.

6. A synthetic rubber latex prepared by the polymerization of a mixture of butadiene-1,3 and acrylonitrile in an aqueous emulsion containing, as an emulsifying agent, an alkali metal salt of a saturated higher fatty acid, said latex also containing, in addition to the said alkali metal salt, another emulsifying agent which is a polyether-alcohol prepared by the condensation of ethylene oxide with a higher fatty alcohol containing from 10 to 18 carbon atoms, the said synthetic rubber latex being stable against coagulation by mechanical agitation and by the addition thereto of latex compounding ingredients and being capable of being deposited to form strong, elastic synthetic rubber films.

7. The method of preparing a synthetic rubber latex which is stable against coagulation by mechanical agitation and by the addition thereto of latex compounding ingredients and which is capable of being deposited to form strong, elastic synthetic rubber films, which comprises polymerizing a butadiene-1,3 hydrocarbon in an aqueous emulsion in the presence of two different emulsifying agents one of which is a colloidal electrolyte selected from the class consisting of water-soluble soaps of saturated higher fatty acids, alkali metal alkaryl sulfonates, alkali metal higher alkyl sulfates and water-soluble salts of higher aliphatic bases, and another of which is a truly water-soluble and non-ionizable long-chained organic compound selected from the class consisting of polyvinyl alcohol and polyether alcohols prepared by the condensation of a compound containing an ethylene oxide linkage with a water-insoluble organic hydroxy compound containing a higher aliphatic radical.

8. The method of preparing a synthetic rubber latex which is stable against coagulation by mechanical agitation and by the addition thereto of latex compounding ingredients and which is capable of being deposited to form strong, elastic synthetic rubber films, which comprises polymerizing a mixture of butadiene-1,3 and a monomer which contains a terminal methylene ($CH_2$) group connected by an olefinic double bond to a carbon atom and is copolymerizable therewith in aqueous emulsion, in an aqueous emulsion in the presence of two different emulsifying agents one of which is a colloidal electrolyte selected from the class consisting of water-soluble soaps of saturated higher fatty acids, alkali metal alkaryl sulfonates, alkali metal higher alkyl sulfates and water-soluble salts of higher aliphatic bases, and another of which is a truly water-soluble and non-ionizable long-chained organic compound selected from the class consisting of polyvinyl alcohol and polyether alcohols prepared by the condensation of a compound containing an ethylene oxide linkage with a water-insoluble organic hydroxy compound containing a higher aliphatic radical.

9. The method of preparing a synthetic rubber latex which is stable against coagulation by mechanical agitation and by the addition thereto of latex compounding ingredients and which is capable of being deposited to form strong, elastic synthetic rubber films, which comprises polymerizing a mixture of butadiene-1,3 and a monomer which contains a terminal methylene ($CH_2$) group connected by an olefinic double bond to a carbon atom and is copolymerizable therewith in aqueous emulsion, in an aqueous emulsion in the presence of two different emulsifying agents one of which is a colloidal electrolyte selected from the class consisting of water-soluble soaps of saturated higher fatty acids, alkali metal alkaryl sulfonates, alkali metal higher alkyl sulfates and water-soluble salts of higher aliphatic bases, and another of which is a polyether-alcohol prepared by the condensation of a compound containing an ethylene oxide linkage with an alcohol containing from 10 to 18 carbon atoms.

10. The method of preparing a synthetic rubber latex which is stable against coagulation by mechanical agitation and by the addition thereto of latex compounding ingredients and which is capable of being deposited to form strong, elastic synthetic rubber films, which comprises polymerizing a mixture of butadiene-1,3 and a monomer which contains a terminal methylene ($CH_2$) group connected by an olefinic double bond to a carbon atom and is copolymerizable therewith in aqueous emulsion, in an aqueous emulsion containing, as an emulsifying agent, a colloidal electrolyte selected from the class consisting of water-soluble soaps of saturated higher fatty acids, alkali metal alkaryl sulfonates, alkali metal higher alkyl sulfates and water-soluble salts of higher aliphatic bases to form an unstable latex, and then adding to this latex another emulsifying agent which is a truly water-soluble but non-ionizable long-chained organic compound selected from the class consisting of polyvinyl alcohol and polyether alcohols prepared by the condensation of a compound containing an ethylene oxide linkage with a water-insoluble organic hydroxy compound containing a higher aliphatic radical.

BENJAMIN M. G. ZWICKER.